United States Patent
Mehrotra et al.

(10) Patent No.: US 6,204,213 B1
(45) Date of Patent: *Mar. 20, 2001

(54) WHISKER REINFORCED CERAMIC CUTTING TOOL AND COMPOSITION THEREOF

(75) Inventors: Pankaj K. Mehrotra; William R. Huston, both of Greensburg, PA (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/399,071

(22) Filed: Sep. 18, 1999

(51) Int. Cl.⁷ ................................................. C04B 35/81
(52) U.S. Cl. .......................... 501/95.3; 501/87; 501/88; 501/91; 501/92; 501/96.1; 407/119; 428/689; 428/698
(58) Field of Search .................................. 501/87, 89, 91, 501/92, 93, 128, 95.3, 96.1; 407/119; 428/698, 689

(56) References Cited

U.S. PATENT DOCUMENTS

| | | |
|---|---|---|
| Re. 32,843 | 1/1989 | Wei ........................................ 501/95 |
| 2,270,607 | 1/1942 | Ryschewitsch . |
| 2,356,009 | 8/1944 | Schwarzkoph . |
| 2,507,218 | 5/1950 | Oswald . |
| 2,849,305 | 8/1958 | Frost . |
| 3,679,442 | 7/1972 | Bergna . |
| 3,886,254 | 5/1975 | Tanka et al. ......................... 264/332 |
| 4,063,908 | 12/1977 | Ogawa et al. .......................... 51/307 |
| 4,132,534 | 1/1979 | Valdsaar ................................ 51/307 |
| 4,158,687 | 6/1979 | Yajima et al. ........................... 264/60 |
| 4,490,319 | 12/1984 | Lee et al. ................................. 264/65 |
| 4,507,224 | 3/1985 | Toibana et al. ....................... 252/516 |
| 4,652,413 | 3/1987 | Tiegs ...................................... 264/66 |
| 4,657,877 | 4/1987 | Becher et al. ........................... 501/89 |
| 4,749,667 | 6/1988 | Jun et al. ................................ 501/89 |
| 4,789,277 | 12/1988 | Rhodes et al. ........................ 409/131 |
| 4,801,510 | 1/1989 | Mehrotra et al. ..................... 428/698 |
| 4,828,584 | 5/1989 | Cutler ...................................... 501/87 |
| 4,843,039 | 6/1989 | Akesson et al. ....................... 501/87 |
| 5,030,597 | 7/1991 | Ogata et al. ............................ 501/96 |
| 5,177,037 | 1/1993 | Schuldies .............................. 51/309 |
| 5,231,060 | 7/1993 | Brandt .................................... 501/87 |
| 5,232,318 | 8/1993 | Santhanam et al. .................. 407/119 |
| 5,264,297 | 11/1993 | Lindal et al. .......................... 428/698 |
| 5,326,731 | 7/1994 | Bhola et al. ............................... 501/8 |
| 5,427,987 | 6/1995 | Mehrotra et al. ....................... 501/96 |
| 5,439,854 | 8/1995 | Suzuki et al. ........................... 501/91 |
| 5,538,926 | 7/1996 | Tsuchida et al. ....................... 501/89 |
| 5,688,729 | 11/1997 | Andersson et al. ..................... 501/89 |
| 5,776,588 | * 7/1998 | Morigushi et al. .................. 428/698 |
| 5,955,390 | * 9/1999 | Mehrotra et al. ....................... 501/87 |

FOREIGN PATENT DOCUMENTS

| | | |
|---|---|---|
| 62-31626 | 7/1987 | (JP) . |
| 62-31627 | 7/1987 | (JP) . |
| 62-31629 | 7/1987 | (JP) . |
| 62-31628 | 9/1987 | (JP) . |
| 63-10758 | 5/1988 | (JP) . |
| 2116691 | 5/1990 | (JP) . |
| 2157176 | 6/1990 | (JP) . |
| 8605480 | 9/1986 | (WO) . |

OTHER PUBLICATIONS

Whitney et al; New and Improved Cutting Tool Materials, Technical Report AFML–TR 69–50 AFML–TR–69–50 (1972) pp. II through V and 47–64, 167–168. No month.

Kpochmal, Fiber Reinforced Ceramics: A review and Assessment of their Potential, Technical Report AFML–TR–67–207 (1967), pp. 9–16. No month.

SILAR–Silicon Carbide Whiskers brochure Price, Schedule (1983). No month.

Buljan et al., Ceramic Whisker–and Particulate Composites: Properties, Reliability and Applications, Ceramic Bull. vol. 68 No. 2 (1989) pp. 387–394. No Month.

* cited by examiner

*Primary Examiner*—Karl Group
(74) *Attorney, Agent, or Firm*—John J. Prizzi

(57) ABSTRACT

A ceramic composition produced by the consolidation of a blend of starting components. The composition comprises a matrix with one or more of the carbides, nitrides and carbonitrides of hafnium, molybdenum, zirconium, tantalum, niobium, vanadium and tungsten, titanium nitride, and titanium carbonitride in an amount that is greater than 50 volume percent of the matrix. The matrix comprises between 60 and 99.8 volume percent of the composition. Ceramic whiskers are uniformly dispersed throughout the matrix wherein the ceramic whiskers comprises between 0.2 and 40 volume percent of the composition.

33 Claims, 6 Drawing Sheets

WHISKER REINFORCED CERAMIC CUTTING TOOL AND COMPOSITION THEREOF

BACKGROUND OF THE INVENTION

The present invention pertains to a ceramic cutting tool, and a composition thereof, that has whisker reinforcement. More specifically, the invention pertains to a ceramic cutting tool, and a composition thereof, that has ceramic whisker reinforcement wherein at least 50 volume percent of the ceramic matrix comprises a carbide, nitride and/or carbonitride of titanium, hafnium, molybdenum, zirconium, tantalum, niobium, vanadium and/or tungsten.

In the past, there have been ceramic bodies with whisker reinforcement such as that disclosed in U.S. Pat. No. 4,543,345 to Wei. The Wei Patent discloses an alumina matrix with silicon carbide whisker reinforcement, a boron carbide matrix with silicon carbide whiskers, and a mullite matrix with silicon carbide whiskers. According to the Wei patent, the incorporation of silicon carbide whiskers increased the fracture toughness of the substrate.

Japanese Publication No. 63-10758 to Yamagawa et al. pertains to a ceramic composite that comprises alumina as its main component. The balance comprises between 5 to 40 weight TiC and 2 to 40 weight percent silicon carbide whiskers. The combined amount of titanium carbide and silicon carbide whiskers cannot exceed 50 weight percent, i.e., it is 50 weight percent or less. This document also mentions that there can be up to 10 weight percent of an oxide, carbide or nitride of aluminum, silicon and the Group IVa, Va and VIa elements.

U.S. Pat. No. 4,507,224 to Toibana et al. makes general reference to certain nitrides and carbides as suitable matrix material, along with electroconductive powder, for SiC fiber reinforcement. The SiC fibers are present in an amount between 5 and 50 weight percent. The '224 patent makes specific reference to matrices of silicon nitride, aluminum nitride, boron nitride, silicon carbide, boron carbide, and titanium carbide. The '224 Patent recites examples that use alumina, zirconium oxide, silicon nitride as matrices along with silicon carbide fibers. The focus of the '224 Patent is on a ceramic article suitable for electric discharge machining. In this regard, the specification states that the electrical resistance of the substrate must not exceed 10 ohm-cm The publication "Fiber Reinforced Ceramics: A Review and Assessment of their Potential" by Kpochmal (at pages 9 through 16) mentions ceramics (with fiber reinforcement) having a HfC or ZrC matrix. The filaments include tungsten, molybdenum, tantalum, boron, carbon, silicon carbide, boron carbide, and alumina.

There have also been ceramic cutting tools with whisker reinforcement. In this regard, U.S. Pat. No. 4,789,277 to Rhodes et al. discloses the use of ceramic whiskers (the content ranges from 2 volume percent to 40 volume percent) such as alumina, aluminum nitride, beryllia, boron carbide, graphite, silicon carbide (preferably), and silicon nitride in a ceramic matrix. The ceramic matrix is preferably alumina, but includes alumina "doped" with up to 30% zirconia, hafnia and titanium carbide. The alumina remains the dominant component of the matrix.

PCT\US 86\00528 Patent Application to Rhodes et al. entitled HIGH DENSITY REINFORCED CERAMIC BODIES AND METHOD OF MAKING SAME has as its focus the pressureless sintering of whisker-reinforced ceramic bodies. This document mentions a whisker content of between 0.5 and 21 volume percent. The specific examples teach the use of an alumina matrix with SiC whisker contents from 6.1 volume percent to 29.2 volume percent.

U.S. Pat. No. 5,059,564 to Mehrotra et al. for an ALUMINA-TITANIUM CARBIDE-SILICON CARBIDE COMPOSITION pertains to an alumina-based matrix containing a dispersion of SiC whiskers and a TiC phase. The SiC whiskers comprise 1.0 to less than 30 volume percent with the most preferred range being 2.5 to 20 volume percent. The TiC comprises 5 to 40 volume percent, and preferably, with up to 3 volume percent of a sintering aid residue.

U.S. Pat. No. 5,427,987 to Mehrotra et al. for a GROUP IVB BORIDE BASED CUTTING TOOLS FOR MACHINING GROUP VIB BASED MATERIALS concerns zirconium boride, hafnium boride and especially titanium boride cutting tools. The addition of W and Co to the boride powder improves the densification of the composition.

The 1969 Air Force Report by Whitney et al. mentions the use of a generally high content of particle reinforcement in ZrN and HfN matrices for use as cutting tools. In this 1969 Report there is no suggestion that whiskers could reinforce these matrices.

U.S. Pat. No. 5,231,060 to Brandt teaches using whiskers of the nitride, carbides and borides of Ti, Zr, Hf, V, Nb or Ta to reinforce an oxide-based matrix such as alumina for use as a cutting tool.

U.S. Pat. No. 5,439,854 to Suzuki et al. pertains to a cutting tool that contains 40 weight percent or more of TiC, and 5 to 40 weight percent of silicon carbide whiskers (of a length equal to 20 micrometers or less). The cutting tool may also contain up to 40 weight percent alumina, as well as sintering aids. Up to 40 weight percent of the TiC may be substituted by Ti or a Ti-based compound such as a nitride, boride, or oxide.

Table I set forth below presents certain physical properties of some prior art commercial cutting tools.

TABLE I

Selected Physical Properties of
Certain Commercial Cutting Tools

| Cutting Tool | HRA | VHN (GPa) [18.5 kg load] | $K_{IC}$(E&C) [MPam$^{1/2}$] |
| --- | --- | --- | --- |
| WG-300 | 94.6 | 19.4 | 6.1 |
| HC6 | 94.6 | 19.4 | 5.1 |
| K090 | 94.8 | 19.1 | 4.7 |

Referring to these commercial cutting tools, the WG-300 cutting tool is sold by Greenleaf Corporation of Saegertown, Pennsylvania and has a composition of about 25 volume percent SiC whiskers and the balance alumina. The HC6 cutting tool is sold by NTK Cutting Tool Division of NGK Spark Plugs (U.S.A.), Inc. of Farmington Hills, Mich., and has a composition of about 70 weight percent TiC and the balance alumina. The K090 cutting tool is made by Kennametal Inc. of Latrobe, Pa. and has a composition of about 70 volume percent alumina and 30 volume percent TiC. Each of these compositions may also contain minor amounts of sintering aid.

SUMMARY OF THE INVENTION

It is an object of the invention to provide an improved ceramic cutting tool, and a composition thereof, that has whisker reinforcement.

It is still another object of the invention to provide an improved ceramic cutting tool, and a composition thereof, that has ceramic whisker reinforcement wherein the ceramic matrix includes about 50 volume percent of one or more of the carbides, nitrides and/or carbonitrides of titanium, hafnium molybdenum, zirconium, tantalum, niobium, vanadium and/or tungsten.

It is another object of the invention to provide an improved ceramic cutting tool, and a composition thereof, that has ceramic whisker reinforcement wherein the ceramic matrix includes about 50 volume percent of one or more of the carbides, nitrides and/or carbonitrides of titanium, hafnium, molybdenum, zirconium, tantalum, niobium, vanadium and/or tungsten, and optionally, the substrate further includes one or more particulates of alumina, silicon carbide or the borides of titanium, zirconium or hafnium.

It is still another object of the invention to provide an improved ceramic cutting tool, and a composition thereof, that has ceramic whisker reinforcement wherein the whiskers include one of alumina, silicon carbide, or the carbides, nitrides, borides or carbonitrides of titanium, zirconium or hafnium.

It is another object of the invention to provide an improved ceramic cutting tool, and a composition thereof, that has ceramic whisker reinforcement wherein the ceramic matrix includes about 50 volume percent of one or more of the carbides, nitrides and/or carbonitrides of titanium, hafnium, molybdenum, zirconium, tantalum, niobium, vanadium and/or tungsten, and optionally, the substrate further includes one or more particulates of alumina, silicon carbide or the borides of titanium, zirconium or hafnium. The ceramic whiskers include one or more of alumina, silicon carbide, silicon nitride, boron carbide, or the carbides, nitrides, borides, or the carbonitrides of titanium, zirconium or hafnium, or the oxides of zirconium or hafnium.

In one form thereof, the invention is a composition produced by the consolidation of a blend of starting components. The composition comprises a matrix which comprises one or more of the carbides, nitrides and carbonitrides of hafnium, molybdenum, zirconium, tantalum, niobium, vanadium, titanium, tungsten and solid solutions thereof in an amount that is greater than 50 volume percent of the matrix. The matrix further includes sintering aid residue present from the use of one or more sintering aids as a starting component in an amount of less than or equal to 1 weight percent of the starting components. The matrix comprises between 60 and 99.8 volume percent of the composition. The composition further includes ceramic whiskers uniformly dispersed throughout the matrix wherein the ceramic whiskers comprises between 0.2 and 40 volume percent of the composition.

In another form thereof, the invention is a ceramic cutting tool that comprises a rake face and a flank face. There is a cutting edge at the juncture of the rake face and the flank face. The tool includes a ceramic composition that has a matrix comprising between about 45 volume percent and less than 50 volume percent of titanium molybdenum carbide, and less than about 55 volume percent alumina. The matrix comprises between about 60 volume percent and about 90 volume percent of the ceramic composition. The composition further includes ceramic whiskers uniformly dispersed throughout the matrix wherein the ceramic whiskers comprise about 2 volume percent to about 35 volume percent of the ceramic composition.

BRIEF DESCRIPTION OF THE FIGURES

The following is a brief description of the figures that comprise a part of this patent application.

DETAILED DESCRIPTION OF SPECIFIC EMBODIMENTS

Figure 1:
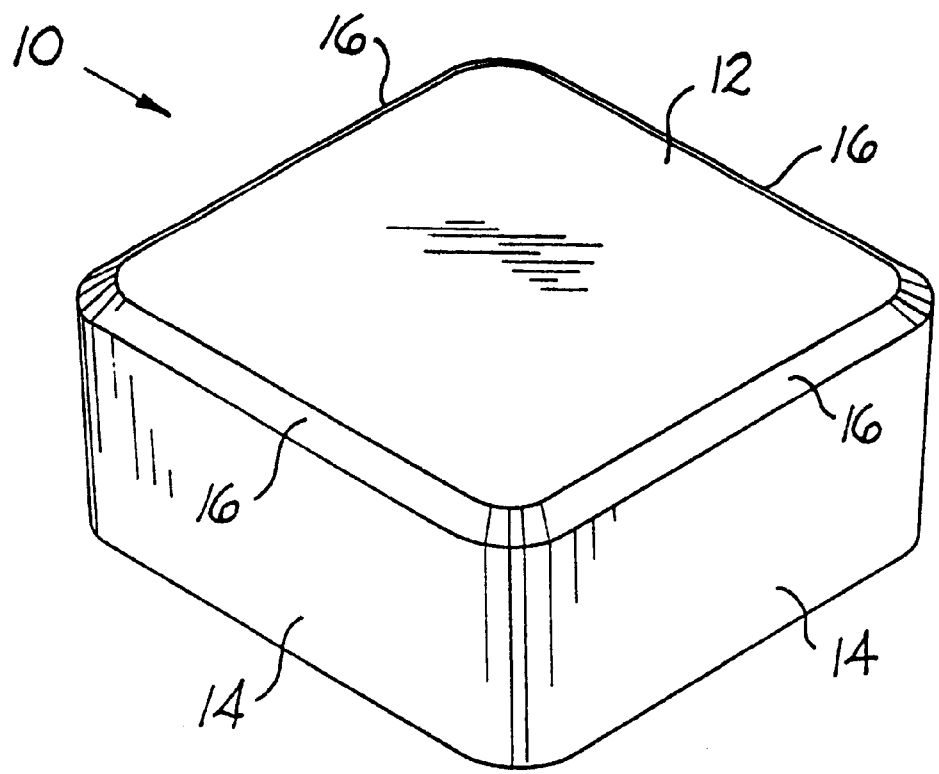
FIG. 1 is an isometric view of a cutting insert that comprises a specific embodiment of the cutting tool of the present invention.

The invention pertains to ceramic compositions, and especially, such ceramic compositions that include ceramic whisker reinforcement. Generally speaking the ceramic cutting tool comprises a ceramic matrix and ceramic whiskers which reinforce the matrix. The combination of the matrix and the whiskers comprises a substrate. The substrate may be coated with a hard material. Examples of such hard materials include alumina, titanium carbide, titanium nitride, titanium carbonitride, titanium aluminum nitride, cubic boron nitride and diamond and their combinations. The coating may be applied by chemical vapor deposition (CVD) [see U.S. Pat. No. 4,801,510 to Mehrotra et al. for ALUMINA COATED SILICON CARBIDE WHISKER-ALUMINA COMPOSITION] or physical vapor deposition (PVD) [see U.S. Pat. No. 5,264,297 to Jindal et al. for PHYSICAL VAPOR DEPOSITION OF TITANIUM NITRIDE ON A NONCONDUCTIVE SUBSTRATE] or a scheme where some layers are applied by PVD and some layers are applied by CVD (see U.S. Pat. No. 5,232,318 to Santhanam et al. for COATED CUTTING TOOLS). The substrates that have a high titanium carbide or titanium carbonitride content, i.e., at least 25 to 30 volume percent titanium carbide or titanium carbonitride, are electrically conductive to such an extent that they are particularly suitable for PVD coating and EDM machining.

The specific matrix of the present invention comprises a carbide, carbonitride and/or nitride of one or more of titanium, hafnium, molybdenum, zirconium, tantalum, niobium, vanadium and/or tungsten so that this component is about 50 volume percent or more of the matrix.

The reason that the preferable content for the carbide, nitride, carbonitride component is over 50 volume percent of the matrix is that this provides for higher hardness and a higher fracture toughness. In this regard, when the carbide, nitride, carbonitride component is over 50 volume percent of the matrix, the fracture toughness is greater than or equal to 6.3 MPam$^{1/2}$ K$_{IC}$, and more preferably greater than or equal to 6.6 MPam$^{1/2}$ K$_{IC}$, and the hardness is greater than or equal to 94.7 Rockwell A. The combination of the high hardness and the high fracture toughness makes these combinations suitable for use as cutting tools, bearings, seal rings, wear plates and nozzles.

In addition, the matrix may include particulates of silicon carbide, titanium boride, zirconium boride, chromium boride, hafnium boride, alumina, zirconium oxide, and hafnium oxide along with sintering aid residues. The preferred content of the sintering aids is less than or equal to 1 weight percent, and the more preferable sintering aid content is less than or equal to 0.5 weight percent. The preferred sintering aids include yttria, magnesia and zirconia either alone or in combination.

The matrix comprises between 60 and 99.8 volume percent of the complete ceramic cutting tool composition.

In regard to the ceramic whiskers, these whiskers are selected from any of the following materials: silicon carbide, titanium carbide, titanium carbonitride, titanium nitride, titanium boride, zirconium carbide, zirconium carbonitride, zirconium nitride, zirconium boride, hafnium carbide, hafnium nitride, hafnium carbonitride, hafnium boride, alumina, silicon nitride and boron carbide. The ceramic whiskers comprise between 0.2 and 40 volume percent of the complete ceramic cutting tool composition.

To maximize fracture toughness in the present invention, it is preferred that a Group IVB (titanium, hafnium or zirconium) nitride or carbonitride-based matrix, more preferably a titanium nitride or titanium carbonitride-based matrix, be reinforced with one or more whiskers of the group consisting of Al$_2$O$_3$, Si$_3$N$_4$, TiB$_2$, SiC, TiC, and B$_4$C. The TiC, TiB$_2$, SiC or B$_4$C whiskers should provide the best fracture toughness in a titanium nitride or titanium carbonitride-based matrix.

Referring to FIG. 1 and the geometry of the specific embodiment, there is illustrated a cutting tool generally designated as 10. Cutting tool 10 has a rake face 12 and a flank face 14. The rake face and the flank face intersect to form a cutting edge 16. The specific configuration is a SNGN-453T style of cutting insert with a T land according to the American National Standard for Cutting Tools-Indexable Inserts-Identification System, ANSI B212.4-1986 (cutting edge preparation: 0.002–0.004 inch ×20° chamfer). Other styles of cutting inserts and edge preparations are acceptable and are contemplated to be within the scope of this invention.

As demonstrated from the examples below, ceramic cutting tools within the above definition have excellent density, hardness and fracture toughness. These properties provide for excellent cutting tools, especially in the high speed machining of steels, cast irons, and nickel-base super alloys.

In machining applications where abrasive wear resistance is more of a concern than chemical wear resistance, a titanium carbide-based matrix is preferable. If, however, chemical wear resistance is more important than abrasive wear resistance, then a hafnium carbide-based or titanium carbonitride-based matrix is preferable. Chemical wear resistance may also be improved by applying a hard coating to the insert such as, for example, titanium nitride, titanium carbonitride, titanium aluminum nitride, titanium carbide, and alumina.

For machining of nickel base super alloys, or for any workpiece in which a combination of high hardness and high chemical inertness is desired, it is preferred that a titanium carbonitride (TiC$_x$ N$_y$) based matrix be used in which x is greater that 0 but less than 0.95 and y+x=1. More preferably, y is greater than or equal to 0.5. For x=0, that is titanium nitride, hardness may be reduced and there may be a reaction between the titanium nitride and the SiC whiskers during the high temperature fabrication of these materials. Therefore, y should be less than 0.95. Optionally, titanium carbonitride may be replaced by hafnium carbonitride or zirconium carbonitride.

The following examples, as described in Tables II through IV below, are exemplary of the invention and were made according to the following method. For all of the examples, the silicon carbide whiskers were ultrasonically dispersed in isopropanol for one hour.

For Examples Nos. 1 through 7, 9 and 10, the silicon carbide whiskers were made by Tokai Carbon Co. of Tokyo, Japan under the designation Grade No. 1. The Tokai whiskers had an average length of 20 to 50 micrometers and an average diameter of 0.3 to 1 micrometers. The crystalline structure of these Tokai SiC whiskers was mostly beta silicon carbide.

For Examples Nos. 11 and 12, the silicon carbide whiskers were obtained from Advanced Composite Materials Corporation of Greer, South Carolina under the grade designation SC-9. The SC-9 whiskers had an average length of 10 to 80 micrometers and an average diameter of 0.6 micrometers. The crystalline structure of these SC-9 SiC whiskers was alpha silicon carbide.

In regard to the method of preparation for Examples Nos. 1 through 7 and 9 through 12, the balance of the components were blended in a mill with isopropanol for one hour. The ultrasonicated silicon carbide whiskers were then blended with the blend of the balance of the components in a mill for 20 minutes. This blend was then discharged through a 200 mesh screen, dried in a rotary evaporator, and then passed through a 100 mesh screen. The dried blend was uniaxially hot pressed in a temperature range of 1750° C. to 1850° C. at 4500 psi for 60 minutes under an argon atmosphere to essentially full density. The resulting product was ground into a SNGN-453T style of cutting insert having a T land, (cutting edge preparation of 0.002 to 0.004 inches and 20 degrees chamfer) as described above.

Tables II through IV below includes in parenthesis the identification of the supplier if there was more than one supplier of the component. The Y$_2$O$_3$ for all of the examples was supplied by Hermann C. Strack Berlin GmbH & Co, KG, P O Box 1229, D-7887 Lauterburg, Baden, Germany.

In Tables II through IV the silicon carbide whiskers supplied by Tokai carry the designation "(T)". The silicon carbide whiskers supplied by Advanced Composite Materials Corporation carry the designation "(A)".

For some of the examples, the Al$_2$O$_3$ was supplied by Nanophase Technologies Corporation of Darien, Ill. under the designation Nanotek Al$_2$O$_3$ Gamma/Delta. In Tables II through IV, the designation "(N)" shows that the Al$_2$O$_3$ powder was obtained from Nanophase. The Nanotek Al$_2$O$_3$ powder had a BET specific surface area of 56.2 square meters/gram. The Al$_2$O$_3$ was greater than 99.9% pure. The phases present were delta and gamma. For the example (Example No. 2) that used the Nanotek Al$_2$O$_3$ powder, an addition of 0.05 volume percent MgO was added to the blend. The Nanotek Al$_2$O$_3$ powder was substantially equiaxed.

The balance of the examples used Al$_2$O$_3$ from several lots of Al$_2$O$_3$ powder that were supplied by Ceralox (a division of Vista Chemical Company) under the designation HPA- 0.5. In Tables II through IV the designation "(C)" shows that the $Al_2O_3$ was from Ceralox. The Ceralox powder had a BET specific surface area of 10.0 to 11.5 square meters/gram. The as-received Ceralox $Al_2O_3$ contained an addition of 0.05 volume percent MgO. The Ceralox $Al_2O_3$ powder was substantially equiaxed.

The TiC supplied by Biesterfeld U.S. Inc., Advanced Materials Department of New York, N.Y. carried the designation Furukawa TiC, and had a BET specific surface area of 8.52 square meters/gram. In Table II the designation "(F)" shows that the TiC was Furukawa TiC. The Furukawa TiC powder was substantially equiaxed.

The TiC particles supplied by the Macro Division of Kennametal Inc. under the designation Grade A had a BET specific surface area of 5.9 square meters/gram. In Table II the designation "(M)" shows that the TiC came from the Macro Division of Kennametal. The Macro Division TiC powder was substantially equiaxed.

The $Ti_{0.8}Mo_{0.2}C$ solid solution powder supplied by the Macro Division of Kennametal Inc. of Port Coquitlam, British Columbia, Canada had a BET specific surface area of 4.6 square meters/gram. The $Ti_{0.8}Mo_{0.2}C$ solid solution powder was substantially equiaxed.

The titanium carbonitride powder supplied by the Macro Division of Kennametal Inc. had a BET specific surface area of 5.2 square meters/gram. This component has a formula of $TiC_{0.7}N_{0.3}$. The Macro Division titanium carbonitride powder was substantially equiaxed.

Tables II through IV below set forth the compositions (and suppliers where indicated) and the hot pressing temperature. The compositions are set forth in volume percent of the entire composition. For those components that are a part of the matrix, the volume percentage of the matrix for that component is set forth in brackets. For all of Examples 1 through 7 and 9 through 12 the alumina component contained about 0.05 volume percent magnesia.

In addition, Tables II through IV below set forth the results of tests to ascertain the following properties of the examples: the density (grams/cc), the Rockwell A hardness, the Vickers hardness, and the fracture toughness ($MPam^{1/2}$) as measured by Evans & Charles (Evans & Charles, "Fracture Toughness Determination by Indentation", J. American Ceramic Society, Vol. 59, Nos. 7–8, pages 371–372 using a 18.5 kg load).

TABLE II $TiC-Al_2O_3$—SiC Whisker Compositions and Physical Properties of Examples Nos. 1–3, 9 and 10

| Ex./Comp & Physical Properties | Example 1 | Example 2 | Example 3 | Example 9 | Example 10 |
|---|---|---|---|---|---|
| TiC | 39.75(F) [53] | 39.75(F) [53] | 39.75(M) [53] | 40(M) [62] | 50(M) [59] |
| $TiC_{.7}N_{.3}$ | — | — | — | — | — |
| $Ti_{.8}Mo_{.2}C$ | — | — | — | — | — |
| $Al_2O_3$ | 35(C) [46.7] | 35(N) [46.7] | 35(C) [46.7] | 24.75(C) [37.7] | 34.75(C) [40.7] |
| $Y_2O_3$ | 0.25 [.3] | 0.25 [.3] | 0.25 [.3] | 0.25 [.3] | 0.25 [.3] |
| $SiC_W$ | 25(T) | 25(T) | 25(T) | 35(T) | 15(T) |
| Temp (° C.) | 1750 | 1750 | 1775 | 1800 | 1800 |
| Density (g/cc) | 4.147 | 4.147 | 4.137 | 4.069 | 4.318 |
| HRA | 95.0 | 95.1 | 94.9 | 94.9 | 94.7 |
| VHN (Gpa) [18.5 kg load] | 21.0 | 20.8 | 19.7 | 21.1 | 20 |
| $K_{IC}$ (E&C) $MPam^{1/2}$ | 6.3 | 6.3 | 6.6 | 7.2 | 6.7 |

TABLE III $TiC_{.7}N_{.3}$-Alumina-SiC Whisker Compositions and Physical Properties of Examples Nos. 4, 7, 11 and 12

| Ex./Comp. & Physical Properties | Example 4 | Example 7 | Example 11 | Example 12 |
|---|---|---|---|---|
| TiC | — | — | — | — |
| $TiC_{.7}N_{.3}$ | 39.03 [52.5] | 39.75 [53] | 39.75 [53] | 39.75 [53] |
| $Ti_{.8}Mo_{.2}C$ | — | — | — | — |
| $Al_2O_3$ | 35.43(C) [47.4] | 35(C) [46.7] | 35(C) [46.7] | 35(C) [46.7] |
| $Y_2O_3$ | 0.25 [.3] | 0.25 [.3] | 0.25 [.3] | 0.25 [.3] |
| $SiC_W$ | 25.29(T) | 25(T) | 25(A) | 25(A) |
| Temp (° C.) | 1800 | 1800 | 1800 | 1850 |
| Density (g/cc) | 4.214 | 4.228 | 4.223 | 4.241 |
| HRA | 95.0 | 95.0 | 94.8 | 94.9 |
| VHN (Gpa) [18.5 kg load] | 20.7 | 21.1 | 19.8 | 20.1 |
| $K_{IC}$ (E&C) $MPam^{1/2}$ | 6.3 | 6.6 | 7.5 | 7.5 |

TABLE IV $Ti_{.8}Mo_{.2}C$-Alumina-SiC Whisker Composites Compositions and Physical Properties of Examples Nos. 5 and 6

| Ex./ Comp. & Physical Properties | Example 5 | Example 6 |
|---|---|---|
| TiC | — | — |
| $TiC_{.7}N_{.3}$ | — | — |
| $Ti_{.8}Mo_{.2}C$ | 34.7 [47.6] | 39.75 [53] |
| $Al_2O_3$ | 38(C) [52] | 35(C) [46.7] |
| $Y_2O_3$ | 0.27 [.4] | 0.25 [.3] |
| $SiC_W$ | 27.03(T) | 25(T) |
| Temp. (° C.) | 1800 | 1800 |
| Density (g/cc) | 4.371 | 4.473 |
| HRA | 95.2 | 95.0 |
| VHN (Gpa) [18.5 kg load] | 20.7 | 21.3 |
| $K_{IC}$ (E&C) $MPam^{1/2}$ | 6.3 | 6.5 |

A review of the physical properties of the examples reveals that these compositions present physical properties that should make excellent cutting tools.

For example, referring to the physical properties of the composites of Table II, Examples Nos. 1 through 3, 9 and 10 present compositions of TiC, alumina and SiC whiskers. The densities for these compositions ranged from 4.069 g/cc to 4.318 g/cc. The Rockwell A hardness (HRA) ranged from 94.7 to 95.1 and the Vickers Hardness ranged from 19.7 to 21.1. The fracture toughness $K_{IC}$ (E&C) ranged from 6.3 to 7.2 $MPam^{1/2}$.

A comparison of Example 10 with Example 9 shows that an increase in the TiC content (from 40 vol. % to 50 vol. %) and the alumina content (from 24.75 vol. % to 34.75 vol. %) coupled with a decrease in the SiC whisker content (from 35 vol. % to 15 vol. %) results in an increase in the density of the sintered composite from 4.069 g/cc to 4.318 g/cc.

Referring to all of the examples of Table II, there does not appear to be any discernible trend in the hardness parameters (Rockwell A and Vickers).

A comparison between Examples Nos. 1 and 2 shows that the coarseness of the alumina powder does not significantly impact the physical properties.

Still referring to the composites in Table II, a comparison between Example 9 and Examples Nos. 1 through 3 reveals that the fracture toughness ($K_{IC}$) appears to significantly increase when the alumina content decreases and the silicon carbide whisker content increases. More specifically, with the TiC content remaining the same, a decrease in alumina from about 35 vol. % to about 25 vol. % coupled with an increase in the silicon carbide whisker content from about 25 vol. % to about 35 vol. % results in an increase in the fracture toughness ($K_{IC}$) from between 6.3 and 6.6 to 7.2 MPam$^{1/2}$.

A comparison of Example 9 with Example 10 reveals that fracture toughness [$K_{IC}$] increases from 6.7 to 7.2 MPam$^{1/2}$ when the TiC and alumina contents decrease and the SiC whisker content increases.

Referring to the physical properties of the $TiC_{0.7}N_{0.3}$-alumina-SiC whisker composites in Table III, it becomes apparent that the use of the SC-9 silicon carbide whiskers from Advanced Composite Materials Corporation provides for an increase in the fracture toughness of this TiCN-alumina-SiC whisker composite from between 6.3 and 6.6 to 7.5 MPam$^{1/2}$. Although the compositions are somewhat similar, the increase in fracture toughness appears to be due to the nature of the SC-9 whiskers as compared to the Tokai silicon carbide whiskers.

Referring to the examples (Examples Nos. 5 and 6) of Table IV that present the physical properties of the $Ti_{0.8}Mo_{0.2}C$-alumina-SiC whisker composites, a comparison between Examples Nos. 5 and 6 shows that a decrease of 5 volume percent in the $Ti_{0.8}Mo_{0.2}C$ coupled with a 3 volume percent increase in the alumina and a 2 volume percent increase in the SiC whiskers does not make a significant impact on the properties of the $Ti_{0.8}Mo_{0.2}C$—$Al_2O_3$—SiC whisker composite.

Overall, it can be seen that the above composites in accordance with the present invention possess a combination of hardness and fracture toughness which are unequaled by the prior art cutting tool compositions shown in Table I.

Figure 2:
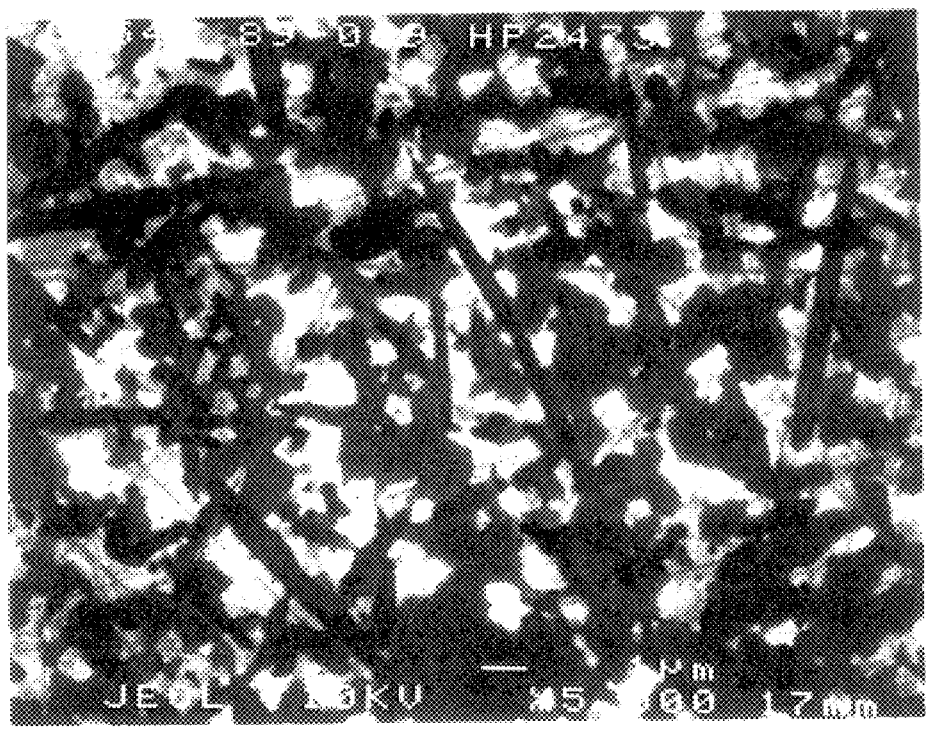
FIG. 2 is a scanning electron microscopy (SEM) secondary electron image photomicrograph (5000X magnification) of a hot-pressed composite in accordance with the present invention corresponding to Example 2 herein showing a polished plane perpendicular to the hot pressing axis.
Figure 3:
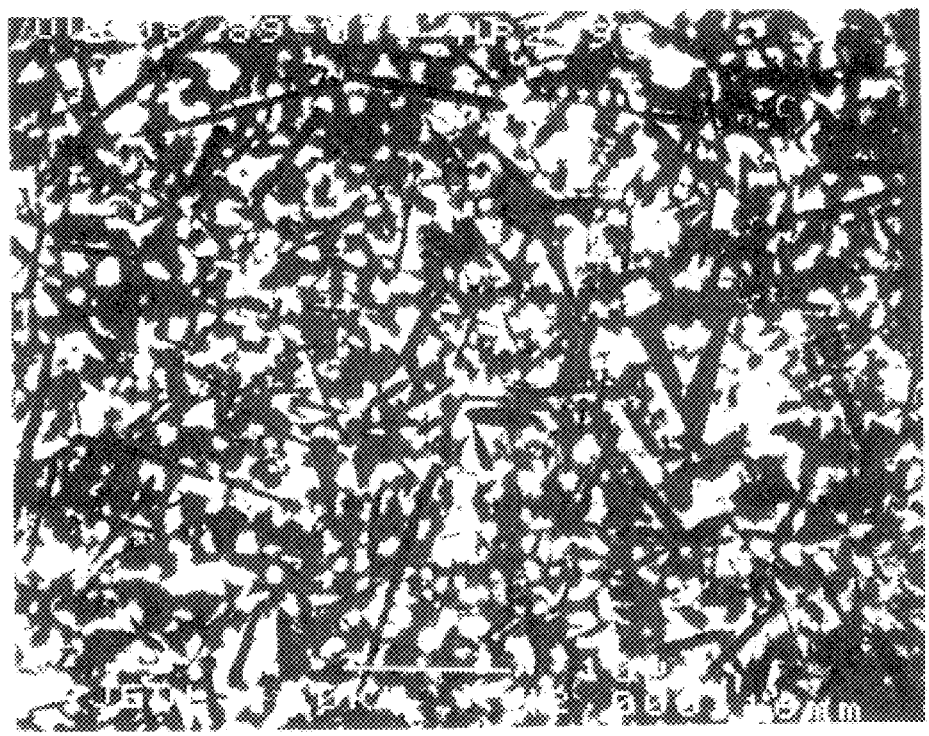
FIG. 3 is a scanning electron microscopy (SEM) secondary electron image photomicrograph (2000X magnification) of a hot-pressed composite in accordance with the present invention corresponding to Example 4 herein showing a polished plane perpendicular to the hot pressing axis.
Figure 4:
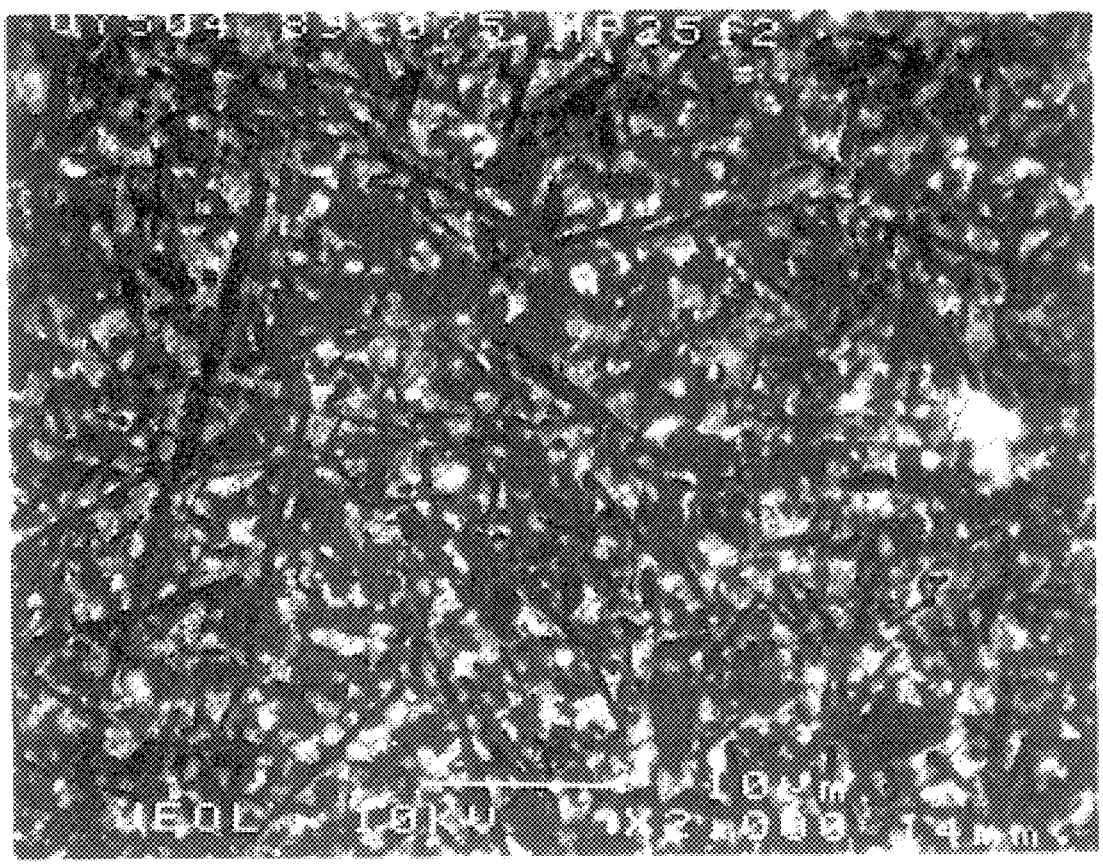
FIG. 4 is a scanning electron microscopy (SEM) secondary electron image photomicrograph (2000X magnification) of a hot-pressed composite in accordance with the present invention corresponding to Example 6 herein showing a polished plane perpendicular to the hot pressing axis.

Photomicrographs which are representative of examples of the compositions in accordance with the present invention are shown in FIGS. 2, 3, and 4. In FIG. 2, which corresponds to Example 2, the lightest phase is alumina, the gray phase is titanium carbide, the elongated (or darkest) phase are silicon carbide whiskers. In FIG. 3, which corresponds to Example 4, the lightest phase is also alumina and the darkest phase is also silicon carbide whiskers, however, the gray phase is titanium carbonitride. In FIG. 4, which corresponds to Example 6, the lightest and darkest phases are respectively alumina and silicon carbide whiskers, however, the gray phase is titanium molybdenum carbide.

Figure 5:
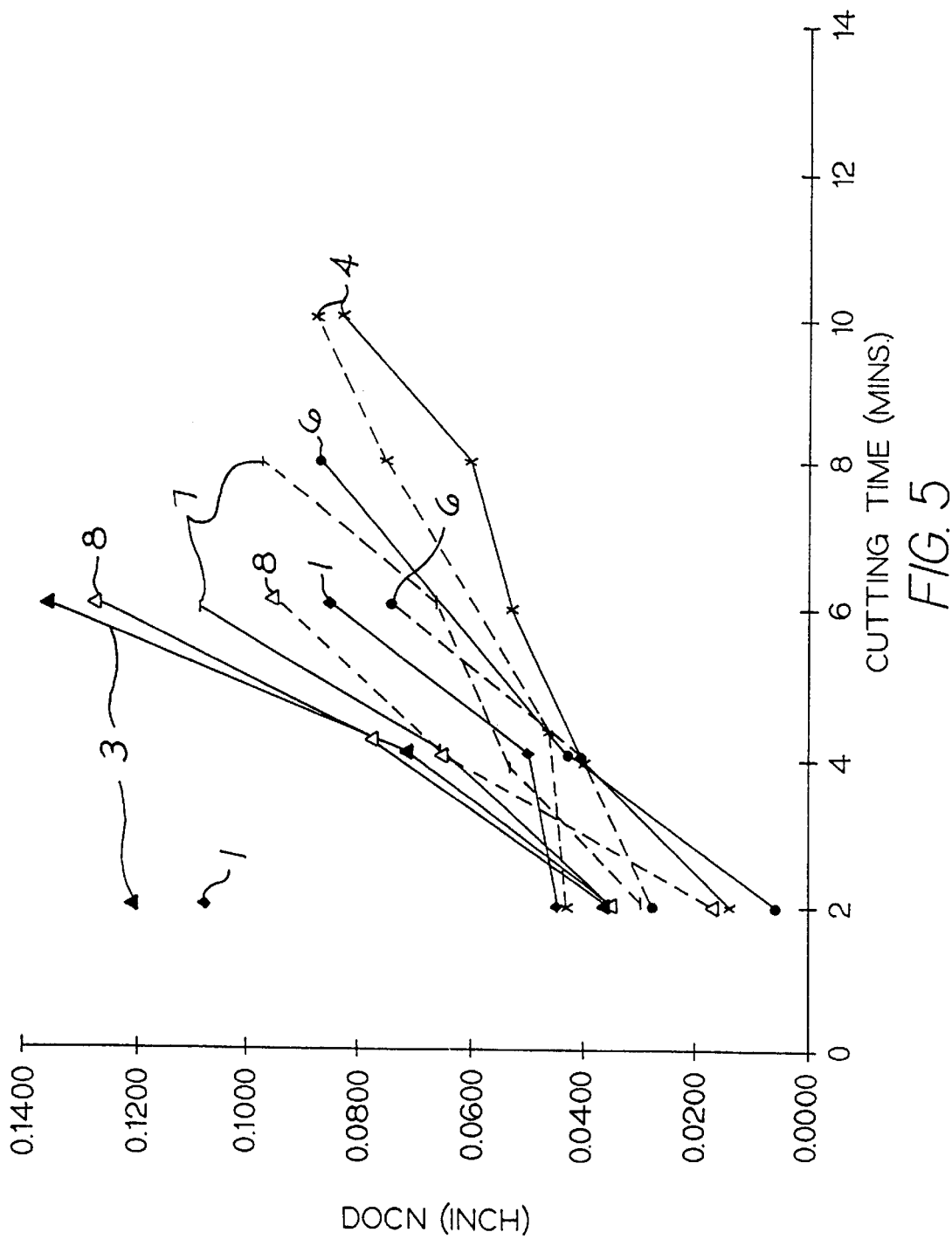
FIG. 5 is a graph of depth of cut notch wear as a function of cutting time for embodiments of the present invention as well as a prior art composition.
Figure 6:
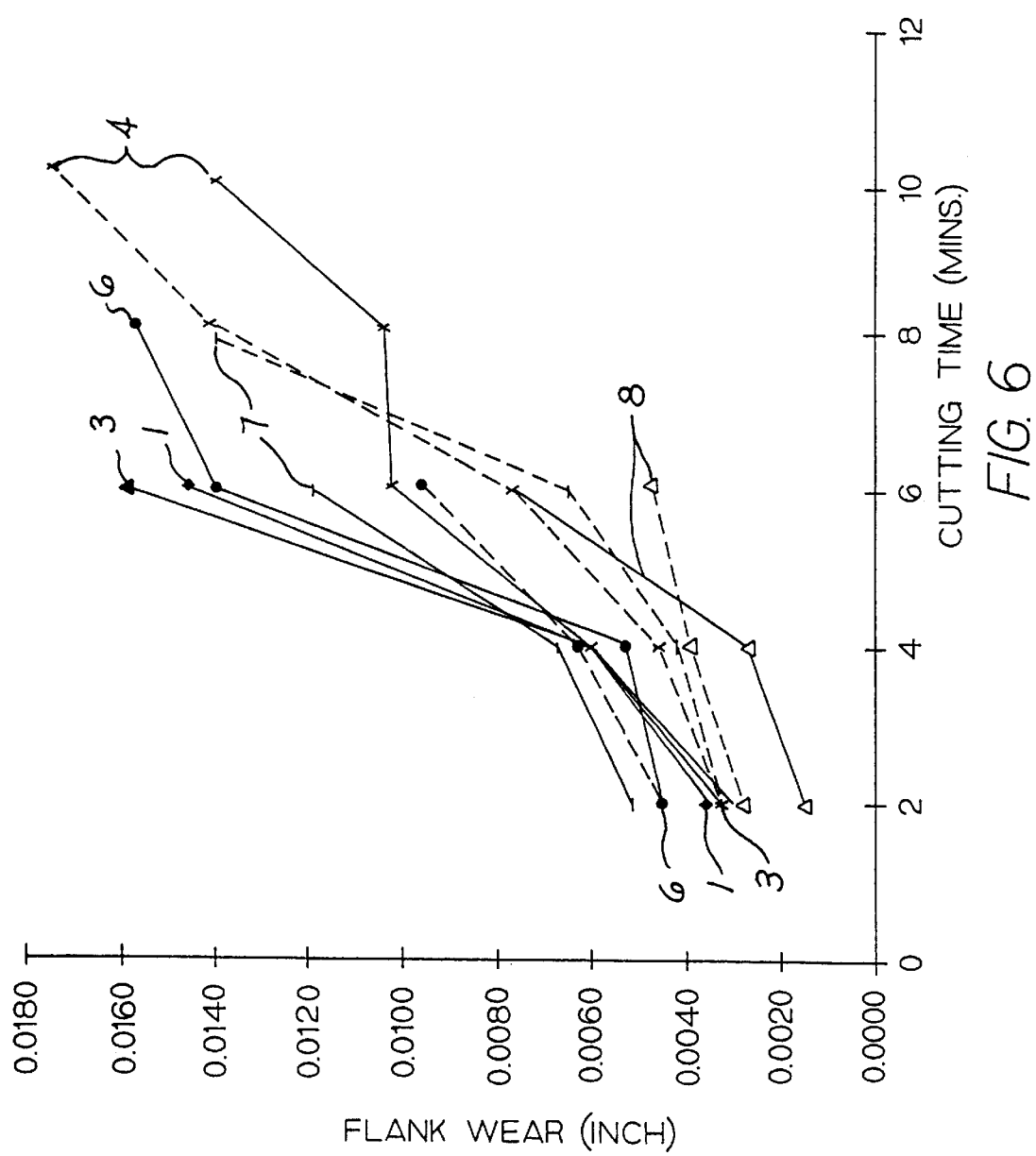
FIG. 6 is a graph of flank wear as a function of cutting time for embodiments of the present invention as well as a prior art composition.
Figure 7:
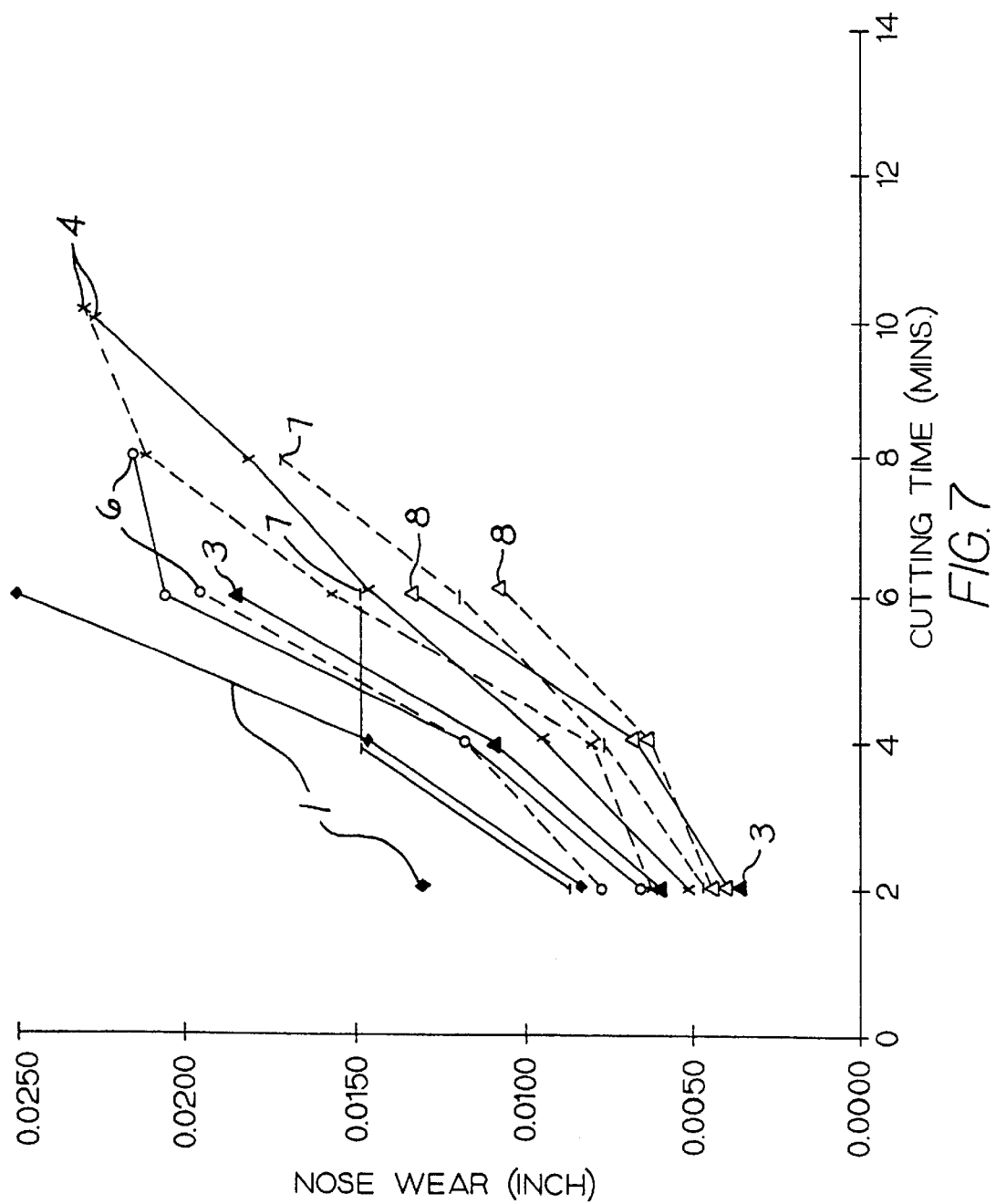
FIG. 7 is a graph of nose wear as a function of cutting time for embodiments of the present invention as well as a prior art composition.

In accordance with the present invention, the compositions of Examples 1, 3, 4, 6, and 7 shown in Tables II were ground into SNGN-453T indexable cutting inserts and used to machine Inconel 718 (hardness 38 Rockwell C) in a turning test under the conditions of 800 surface feet/minute speed, 0.006 inch per revolution, feed rate, and 0.050 inch depth of cut, flood coolant, and a 45 degree lead angle. The end of life criteria used was: flank wear (FW)=0.030 inch; maximum flank wear (MW)=0.040 inch; nose wear (NW)= 0.040 inch; depth of cut notch (DN)=0.080 inch; and crater wear (CR)=0.004 inch. Included in the tests were samples of WG-300 (Example No. 8) in the same insert geometry for comparison purposes. The results of these tests are shown in Table V below and in FIGS. 5, 6, and 7. Each example is identified in FIGS. 5, 6 and 7 by its identical reference numeral. These results indicate that the tools having a matrix based on titanium carbonitride or titanium molybdenum carbide had the best cutting edge life time under the above conditions. The most rapid wear mechanism and the wear mechanism which lead to failure was depth of cut notching on all the materials shown in Table V.

TABLE V

Tool Life & Failure Mode for Examples Nos. 1, 3, 4, 6, 7 and WG-300

| Example | Rep. 1 (Minutes) | Rep. 2 (Minutes) | Tool Life Average (Minutes) | Relative % Tool Life vs. WG-300 |
| --- | --- | --- | --- | --- |
| 1 | 5.8 DN | 1.5 DN | 3.7 | 78% |
| 3 | 4.3 DN | 1.3 DN | 2.8 | 60% |
| 4 | 9.7 DN | 8.8 DN | 9.3 | 197% |
| 6 | 7.3 DN | 6.4 DN | 6.9 | 146% |
| 7 | 4.7 DN | 6.9 DN | 5.8 | 123% |
| 8 | 4.3 DN | 5.1 DN | 4.7 | 100% |

However, the flank wear resistance of the present invention was less than that of the prior art grade tested. It is believed that flank wear resistance may be improved by increasing the nitrogen content of the titanium carbonitride forming the matrix or increasing the molybdenum content of the titanium molybdenum carbide used in the matrix. Flank wear resistance of the present invention may also be improved by applying a hard coating to the cutting insert composed of compositions in accordance with the present invention. Preferred hard coatings include titanium nitride, titanium carbonitride, titanium aluminum nitride, and alumina coatings applied by PVD and/or CVD techniques.

The flank wear resistance of the prior art grade tested (Example No. 8/WG-300) appeared to be better than Examples Nos. 1, 3, 4, 6 and 7. This may be due to the greater alumina content in the prior art grade. More specifically, the prior art grade (Example No. 8/WG-300) has an alumina content of about 75 volume percent as compared with about 35 to 40 volume percent for Examples Nos. 1, 3, 4, 6 and 7. The flank wear resistance of the present invention may be improved by the use of greater amounts of alumina or by decreasing the amount of silicon carbide whiskers present and increasing one or more of the matrix phases, e.g., titanium carbonitride or alumina.

All applications, patents and other documents referred to herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A composition produced by the consolidation of a blend of starting components, the composition comprising:

a matrix comprising one or more of the carbides, nitrides and carbonitrides of hafnium, molybdenum, tungsten, zirconium, tantalum, niobium, vanadium, titanium, and solid solutions thereof in an amount that is greater than 50 volume percent of the matrix, the matrix further includes sintering aid residue present from the use of one or more sintering aids as a starting component in an amount less than 0.5 weight percent of the starting components wherein the sintering aid comprises one or more of yttria, magnesia and zirconia, the matrix comprising between 60 and 99.8 volume percent of the composition; and ceramic whiskers uniformly dispersed throughout the matrix, the ceramic whiskers comprising between 0.2 and 40 volume percent of the composition.

2. The composition of claim 1 wherein the ceramic whiskers comprise silicon carbide whiskers, and the silicon carbide whiskers having an average length between about 20 micrometers and about 50 micrometers, an average diameter of between about 0.3 micrometers and about 1 micrometer, and the crystalline structure of the silicon carbide whiskers is predominantly beta silicon carbide.

3. The composition of claim 2 wherein the fracture toughness of the ceramic cutting tool is equal to or greater than about 6.3 MPam$^{1/2}$K$_{IC}$ and a hardness of greater than or equal to 94.7 Rockwell A.

4. The composition of claim 1 wherein the ceramic whiskers comprise silicon carbide whiskers, and the silicon carbide whiskers having an average length between about 10 micrometers and about 80 micrometers, an average diameter of about 0.6 micrometers, and the crystalline structure of the silicon carbide whiskers is predominantly alpha silicon carbide.

5. The composition of claim 4 wherein the fracture toughness of the ceramic cutting tool is equal to or greater than about 7.5 MPam$^{1/2}$K$_{IC}$ and a hardness of greater than or equal to 94.7 Rockwell A.

6. A ceramic cutting tool comprising:
a rake face; and a flank face, a cutting edge at the juncture of the rake face and the flank face;
a ceramic composition having a matrix comprising at least 50 volume percent of one or more of the carbides, nitrides and carbonitrides of hafnium, molybdenum, zirconium, tantalum, niobium, vanadium, tungsten, titanium, and solid solutions thereof, the matrix further includes sintering aid residue present from the use of one or more sintering aids as a starting component in an amount less than 0.5 weight percent of the starting components wherein the sintering aid comprises one or more of yttria, magnesia and zirconia, wherein the matrix comprises between 60 and 99.8 volume percent of the ceramic composition; and
ceramic whiskers uniformly dispersed throughout the matrix wherein the ceramic whiskers comprise between 0.2 and 40 volume percent of the ceramic composition.

7. The ceramic cutting tool of claim 6 wherein the ceramic cutting tool further includes a coating, and the coating comprises a layer selected from the group consisting of alumina, titanium carbide, titanium nitride, titanium carbonitride, and titanium aluminum nitride.

8. The ceramic cutting tool of claim 7 wherein the layer is applied by chemical vapor deposition.

9. The ceramic cutting tool of claim 7 wherein the layer is applied by physical vapor deposition.

10. The ceramic cutting tool of claim 7 wherein the ceramic whiskers are silicon carbide whiskers.

11. The ceramic cutting tool of claim 10 wherein the silicon carbide whiskers having an average length between about 20 micrometers and about 50 micrometers, an average diameter of between about 0.3 micrometers and about 1 micrometer, and the crystalline structure of the silicon carbide whiskers is predominantly beta silicon carbide.

12. The ceramic cutting tool of claim 11 wherein the fracture toughness of the coated ceramic cutting tool is equal to or greater than 6.6 MPam$^{1/2}$K$_{IC}$ and a hardness of greater than or equal to 94.7 Rockwell A.

13. The ceramic cutting tool of claim 10 wherein the silicon carbide whiskers having an average length between about 10 micrometers and about 80 micrometers, an average diameter of about 0.6 micrometers, and the crystalline structure of the silicon carbide whiskers is predominantly alpha silicon carbide.

14. The ceramic cutting tool of claim 13 wherein the fracture toughness of the coated ceramic cutting tool is equal to or greater than 7.5 MPam$^{1/2}$K$_{IC}$ and a hardness of greater than or equal to 94.7 Rockwell A.

15. A method of cutting metal wherein a ceramic cutting tool is brought into contact with a metal workpiece and the ceramic cutting tool and metal workpiece move relative to each other whereby metal is removed by the ceramic cutting tool from the metal workpiece using a ceramic cutting tool comprising:
a rake face and a flank face wherein the rake face and the flank face intersect to form a cutting edge;
the composition of the ceramic cutting tool comprising a matrix including:
titanium carbonitride in an amount of about 50 volume percent or more of the matrix;
alumina in an amount that is greater than about 40 volume percent of the matrix; and
sintering aid residue present from the use of one or more sintering aids as a starting component in an amount less than 0.5 weight percent of the starting components wherein the sintering aid comprises one or more of yttria, magnesia and zirconia;
the matrix comprising between 60 and 99.8 volume percent of the composition of the ceramic cutting tool;
the composition of the ceramic cutting tool further comprising ceramic whiskers uniformly dispersed throughout the matrix, the ceramic whiskers comprising between 0.2 and 40 volume percent of the composition;
the titanium carbonitride having the formula Ti(C$_x$N$_y$) wherein y is less than 0.9 and greater than or equal to 0.5, and x+y=1; and
the ceramic cutting tool having a fracture toughness of greater than or equal to about 6.3 MPam$^{1/2}$K$_{IC}$ and a hardness of greater than or equal to about 94.7 Rockwell A.

16. The method of claim 15 wherein the ceramic whiskers comprise silicon carbide whiskers, and the silicon carbide whiskers having an average length between about 20 micrometers and about 50 micrometers, an average diameter of between about 0.3 micrometers and about 1 micrometer, and the crystalline structure of the silicon carbide whiskers is predominantly beta silicon carbide.

17. The method of claim 15 wherein the ceramic whiskers comprise silicon carbide whiskers, and the silicon carbide whiskers having an average length between about 10 micrometers and about 80 micrometers, an average diameter of about 0.6 micrometers, and the crystalline structure of the silicon carbide whiskers is predominantly alpha silicon carbide.

18. The method of claim 17 wherein the fracture toughness of the composition is equal to or greater than 7.5 MPam$^{1/2}$.

19. The method of claim 15 wherein the ceramic cutting tool includes a coating, and the coating comprises a layer selected from the group consisting of alumina, titanium carbide, titanium nitride, titanium carbonitride, and titanium aluminum nitride.

20. The method of claim 19 wherein the coating layer is applied by chemical vapor deposition.

21. The method of claim 19 wherein the coating layer is applied by physical vapor deposition.

22. The ceramic cutting tool of claim 6 wherein the ceramic cutting tool further comprising a coating scheme comprising one layer of titanium carbonitride and another layer of alumina.

23. The ceramic cutting tool of claim 22 wherein the layer of titanium carbonitride and the layer of alumina is each applied by chemical vapor deposition.

24. The ceramic cutting tool of claim 6 further comprising a coating scheme comprising a first layer of titanium carbonitride applied to at least a portion of one or both of the rake face and the flank face, and the coating scheme further including a second layer of alumina.

25. The ceramic cutting tool of claim 24 wherein the second layer of alumina being applied to the surface of the first layer of titanium carbonitride.

26. The method of claim 15 wherein the ceramic cutting tool includes a coating, and the coating comprising a first layer of titanium carbonitride and a second layer of alumina.

27. The method of claim 26 wherein the first layer of titanium carbonitride being applied to at least a portion of one or both of the rake face and the flank face.

28. The method of claim 27 wherein the second layer of alumina being applied to the first layer of titanium carbonitride.

29. The method of claim 26 wherein the first layer of titanium carbonitride and the second layer of alumina is each applied by chemical vapor deposition.

30. A coated ceramic cutting tool comprising:
a substrate presenting a rake face and a flank face, a cutting edge at the juncture of the rake face and the flank face;
the substrate having a composition comprising a matrix comprising at least 50 volume percent of one or more of the carbides, nitrides and carbonitrides of hafnium, molybdenum, zirconium, tantalum, niobium, vanadium, tungsten, titanium and solid solutions thereof, the matrix further comprising the sinter aid residue present from the use of one more sintering aids as a starting component in an amount less than 1 weight percent of the starting components wherein the sintering aid comprises one or more of yttria, magnesia, and zirconia, wherein the matrix comprises between 60 and 99.8 volume percent of the substrate composition;
ceramic whiskers uniformly dispersed throughout the matrix wherein the ceramic whiskers comprises between 0.2 and 40 volume percent of the substrate composition; and
a coating on at least a portion of the substrate.

31. The coated ceramic cutting tool of claim 30 the coating comprising layer selected from the group consisting of alumina, titanium carbide, titanium nitride, titanium carbonitride, and titanium aluminum nitride.

32. The coated ceramic cutting tool of claim 30 wherein the matrix comprising titanium carbonitride in an amount of about 50 volume percent or more of the matrix, alumina in an amount that is greater than about 40 volume percent of the matrix; and the ceramic wiskers comprising silicon carbide whiskers.

33. The coated ceramic cutting tool of claim 32 wherein the matrix comprising between about 70 volume percent and about 90 volume percent of the substrate composition, and the silicon carbide whiskers comprising between about 10 volume percent and about 30 volume percent of the substrate composition.

* * * * *